United States Patent
Cantrell, Jr. et al.

(10) Patent No.: US 10,798,111 B2
(45) Date of Patent: Oct. 6, 2020

(54) DETECTING INTRUSION ATTEMPTS IN DATA TRANSMISSION SESSIONS

(71) Applicant: International Business Machines Corporation, Armonk, NY (US)

(72) Inventors: Henry L. Cantrell, Jr., Raleigh, NC (US); Charles Cruse, Jr., Raleigh, NC (US); Kerry R. Harpe, Durham, NC (US); Christopher Meyer, Cary, NC (US); Clifford P. Wall, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 319 days.

(21) Appl. No.: 15/265,023

(22) Filed: Sep. 14, 2016

(65) Prior Publication Data

US 2018/0077176 A1 Mar. 15, 2018

(51) Int. Cl.
*H04L 29/06* (2006.01)
*H04L 29/08* (2006.01)

(52) U.S. Cl.
CPC .......... *H04L 63/1416* (2013.01); *H04L 67/12* (2013.01)

(58) Field of Classification Search
CPC ............................ H04L 63/1416; H04L 67/12
See application file for complete search history.

(56) References Cited

U.S. PATENT DOCUMENTS

| | | | | | |
|---|---|---|---|---|---|
| 4,348,739 | A | * | 9/1982 | Deaver | G06F 13/387 710/8 |
| 4,575,793 | A | * | 3/1986 | Morel | G06F 13/385 710/305 |
| 4,672,574 | A | * | 6/1987 | Baird | G06F 3/14 709/224 |
| 5,086,434 | A | * | 2/1992 | Abe | H04N 1/411 358/450 |
| 5,247,663 | A | * | 9/1993 | Busboom | G06F 3/0489 |
| 5,566,310 | A | * | 10/1996 | Mathewson, II | G06F 13/387 703/26 |
| 5,649,101 | A | * | 7/1997 | Mathewson, II | G06F 13/387 709/245 |
| 7,609,621 | B1 | * | 10/2009 | Kanagala | H04L 45/28 370/227 |

(Continued)

OTHER PUBLICATIONS

IBM, 3270 Information Display System, Data Stream Programmer's Reference, Fifth Edition, Dec. 1988, pp. 1-380.*

(Continued)

*Primary Examiner* — Luu T Pham
*Assistant Examiner* — James J Wilcox
(74) *Attorney, Agent, or Firm* — Daniel R. Simek (57) ABSTRACT

A computer-implemented method includes identifying a data transmission session associated with a display-oriented data transmission scheme; identifying an outbound data stream associated with the data transmission session; and determining one or more protected fields associated with the outbound data stream. The computer-implemented method further includes determining a client attempt to write to at least one of the one or more protected fields; and in response to determining said client attempt, determining an intrusion detection report. A corresponding computer program product and computer system are also disclosed.

17 Claims, 4 Drawing Sheets

(56) References Cited

U.S. PATENT DOCUMENTS

| | | | | |
|---|---|---|---|---|
| 7,729,334 | B2* | 6/2010 | Yi | H04L 1/189 370/349 |
| 7,941,849 | B2 | 5/2011 | Ting | |
| 7,962,742 | B2* | 6/2011 | Schwarz | H04L 63/166 713/150 |
| 8,291,005 | B2* | 10/2012 | Lang | G06F 9/546 707/690 |
| 8,407,223 | B2* | 3/2013 | Guralnik | G06F 16/70 707/737 |
| 8,433,791 | B2 | 4/2013 | Krelbaum et al. | |
| 8,543,707 | B2* | 9/2013 | Jeong | G06F 21/10 709/227 |
| 8,776,206 | B1* | 7/2014 | Goldstein | H04L 63/0227 709/224 |
| 9,047,269 | B2 | 6/2015 | Armstrong et al. | |
| 9,800,560 | B1* | 10/2017 | Guo | H04L 63/0435 |
| 2002/0019884 | A1* | 2/2002 | Gungabeesoon | G06F 9/541 719/310 |
| 2002/0060985 | A1* | 5/2002 | Lee | H04L 45/22 370/216 |
| 2003/0069994 | A1* | 4/2003 | Herceg | G06F 3/023 709/246 |
| 2003/0070003 | A1* | 4/2003 | Chong | H04L 63/1408 719/330 |
| 2004/0049693 | A1* | 3/2004 | Douglas | G06F 21/552 726/23 |
| 2004/0230806 | A1* | 11/2004 | Lisanke | G06F 21/10 713/182 |
| 2005/0065800 | A1* | 3/2005 | Green | G06F 13/105 705/1.1 |
| 2005/0094554 | A1* | 5/2005 | Nakash | H04L 2/437 370/222 |
| 2005/0132225 | A1* | 6/2005 | Gearhart | G06F 21/577 726/4 |
| 2006/0059557 | A1* | 3/2006 | Markham | G08B 31/00 726/22 |
| 2006/0070128 | A1* | 3/2006 | Heimerdinger | H04L 63/1416 726/23 |
| 2006/0153069 | A1* | 7/2006 | Lund | H04J 3/14 370/225 |
| 2006/0184410 | A1 | 8/2006 | Ramamurthy et al. | |
| 2007/0282951 | A1* | 12/2007 | Selimis | H04L 67/06 709/205 |
| 2008/0061969 | A1* | 3/2008 | Okude | G08B 13/10 340/541 |
| 2008/0244694 | A1* | 10/2008 | Neystadt | H04L 63/1425 726/1 |
| 2009/0113017 | A1* | 4/2009 | Parcher | G06F 16/9577 709/207 |
| 2010/0122317 | A1* | 5/2010 | Yadav | H04L 63/1408 726/1 |
| 2011/0185280 | A1 | 7/2011 | Nakash et al. | |
| 2012/0123563 | A1* | 5/2012 | Drinkard | F16P 3/142 700/13 |
| 2012/0319843 | A1* | 12/2012 | Aizawa | G08B 13/2497 340/541 |
| 2014/0029622 | A1* | 1/2014 | Bettink | H04L 47/10 370/394 |
| 2014/0064292 | A1* | 3/2014 | Binetti | H04L 45/28 370/412 |
| 2014/0101253 | A1* | 4/2014 | Bhogal | G06F 3/1454 709/204 |
| 2014/0310800 | A1* | 10/2014 | Kabra | G06F 21/78 726/17 |
| 2015/0074363 | A1* | 3/2015 | Diel | G06F 3/065 711/162 |
| 2016/0234248 | A1* | 8/2016 | Thyni | H04L 63/1441 |

OTHER PUBLICATIONS

Hofmann, Online Intrusion Alert Aggregation with Generative Data Stream Modeling, IEEE Transactions on Dependable and Secure Computing, vol. 8, No. 2, Mar.-Apr. 2011, pp. 282-294 (Year: 2011).*

Kumaran, Event Stream Database Based Architecture to Detect Network Intrusion (Industry Article), DEBS'13, Jun. 29, 2013-Jul. 3, 2013, pp. 241-247 (Year: 2013).*

"Z/OS V2R2 Communications Server:3270 Intrusion Detection Services", IBM, Modified date: Apr. 29, 2016, Software version: 2.2, printed on Jul. 13, 2016, 2 pages, evidence of Grace Period Disclosure, <http://www-Ol.ibm.com/support/doc view.wss?uid=swg27047957>.

"OA49911-3270 Intrusion Detection Services (part 1)", z/Os Communications Server, Version 2, Release 2, 160 pages, retrieved on Jul. 31, 2016, evidence of Grace Period Disclosure, <http://www-Ol.ibm.com/support/doc view.wss?uid=swg27047957>.

"OA49911-3270 Intrusion Detection Services (part 2)", z/OS Communications Server, Version 2, Release 2, 82 pages, retrieved on Jul. 3, 2016, evidence of Grace Period Disclosure, <http://www-Ol.ibm.com/support/doc view.wss?uid=swg27047957>.

* cited by examiner

DETECTING INTRUSION ATTEMPTS IN DATA TRANSMISSION SESSIONS

BACKGROUND

The present invention relates generally to the field of data transmission systems, and more particularly to detecting intrusion attempts in such systems.

In data transmission systems, detecting intrusion attempts is important for safeguarding the security and integrity of those systems, as well as ensuring the proper operation of the services rendered by such data transmission systems. Developers and users of data transmission systems continue to have difficulties with detecting intrusion attempts in such systems.

SUMMARY

A computer-implemented method includes identifying a data transmission session associated with a display-oriented data transmission scheme; identifying an outbound data stream associated with the data transmission session; and determining one or more protected fields associated with the outbound data stream. The computer-implemented method further includes determining a client attempt to write to at least one of the one or more protected fields; and in response to determining said client attempt, determining an intrusion detection report. A corresponding computer program product and computer system are also disclosed.

DETAILED DESCRIPTION

Figure 1:
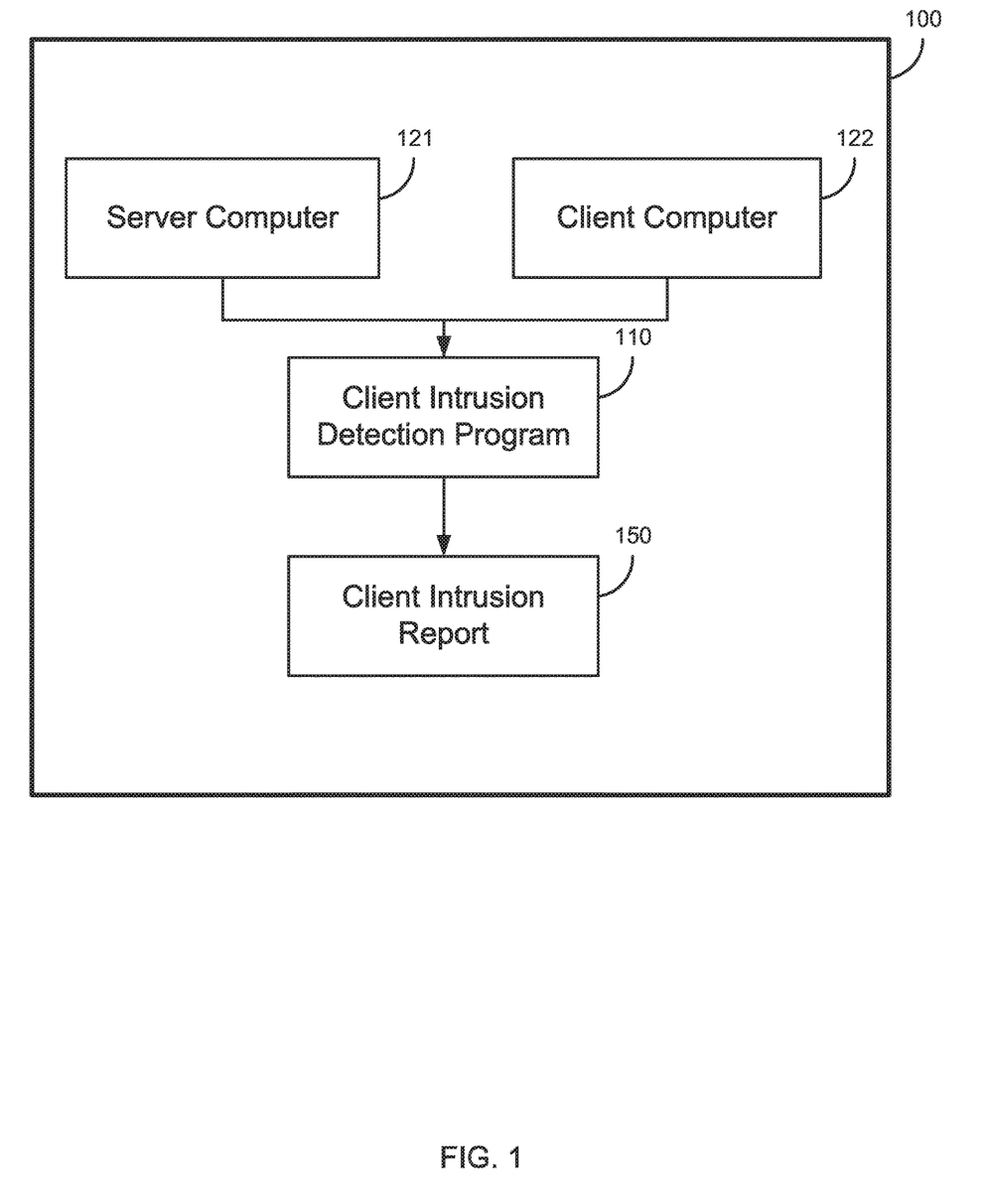
FIG. 1 is a block diagram of one embodiment of a computer system environment suitable for operation of a client intrusion detection program, in accordance with at least one embodiment of the present invention.

FIG. 1 is a computer system environment 100 suitable for operating a client intrusion detection program 110, in accordance with at least one embodiment of the present invention. In the computer system environment 100 depicted in FIG. 1, the client intrusion detection program 110 interacts with a server computer 121 (e.g., a mainframe computer on which one or more computer applications reside) and a client computer 122 (e.g., a client using the services of the one or more computer applications residing on a mainframe computer). In at least some embodiments, the server computer 121 communicates with the client computer 122 through a data transmission session (i.e., an arrangement and/or protocol through which the server computer 121 and the client computer 122 send and/or receive data), wherein the data transmission session uses a display-oriented data transmission scheme (i.e., a manner of data transmission in which the transmitted data is capable of being displayed on at least one computer terminal). Examples of a display-oriented data transmission scheme include the data transmission scheme used to transmit data to IBM 3270 clients (such as IBM 3270 emulators). In some embodiments, a display-oriented data transmission scheme is block-oriented (i.e., the data is transmitted in blocks of data). As used herein, the acronym "IBM" refers to International Business Machines Corporation, the Applicant, and the term "IBM 3270" refers to the class of terminals for communication with IBM mainframe computers as well as to terminal emulators of the same class and the data transmission scheme and/or protocol for such terminals and terminal emulators.

In the computer system environment depicted in FIG. 1, the client intrusion detection program 110 uses the information received from the server computer 121 and the client computer 122 to determine an intrusion detection report 150. In at least some embodiments, an intrusion detection report 150 is any combination of one or more data artefacts that present and/or indicate at least one information artefact about at least one property associated with an attempt to intrude into the server computer 121 by a client computer 122.

Figure 2:
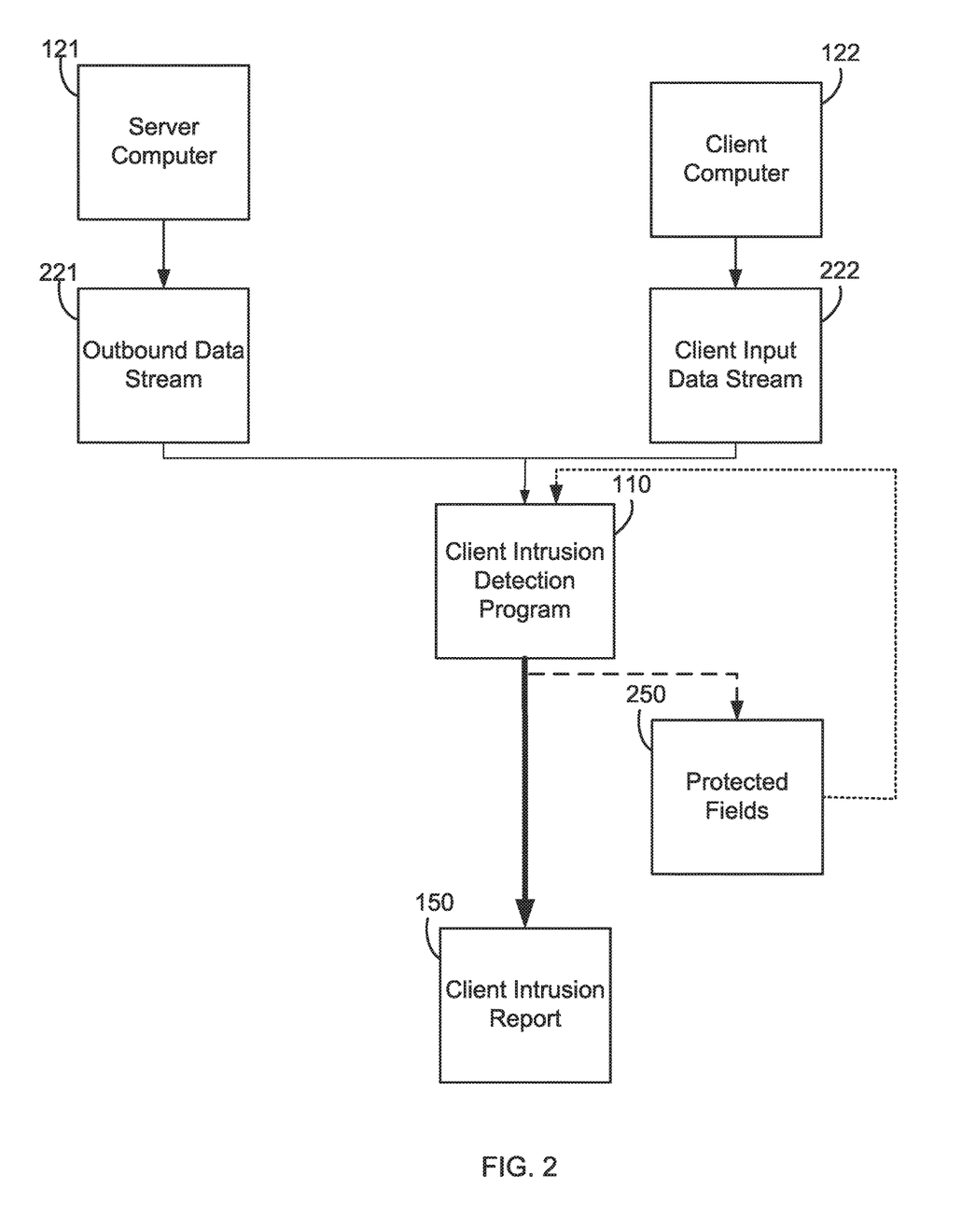
FIG. 2 is a data flow diagram of a client intrusion detection program, in accordance with at least one embodiment of the present invention.

FIG. 2 is a data-flow diagram of a client intrusion detection program 110, in accordance with at least one embodiment of the present invention. In the embodiment depicted in FIG. 2, the client intrusion detection program 110 receives an outbound data stream 221 (i.e., a combination of one or more data artefacts that the server computer 121 intends to transmit to the client computer 122) from the server computer 121. The program determines one or more protected fields 250 based on the outbound data stream 221. In at least some embodiments, a protected field 250 is a designation of data fields within the outbound data stream 221 that are: (1) noted as unreceptive to input by a client computer 122; and/or (2) have properties that suggest and/or require that a client computer should not be able to input into those fields. In at least some embodiments, a data stream is a combination of one or more data artefacts.

In the embodiment depicted in FIG. 2, the client intrusion detection program 110 receives a client input data stream 222 (i.e., a combination of one or more data artefacts that the client computer 122 intends to transmit in response to the outbound data stream 221) from the client computer 122. The program then determines the intrusion detection report 150 based on the client input data stream 222 and the one or more protected fields 250 (e.g., if the client intrusion detection program 110 detects a client attempt to write to at least one of the one or more protected fields 250).

Figure 3:
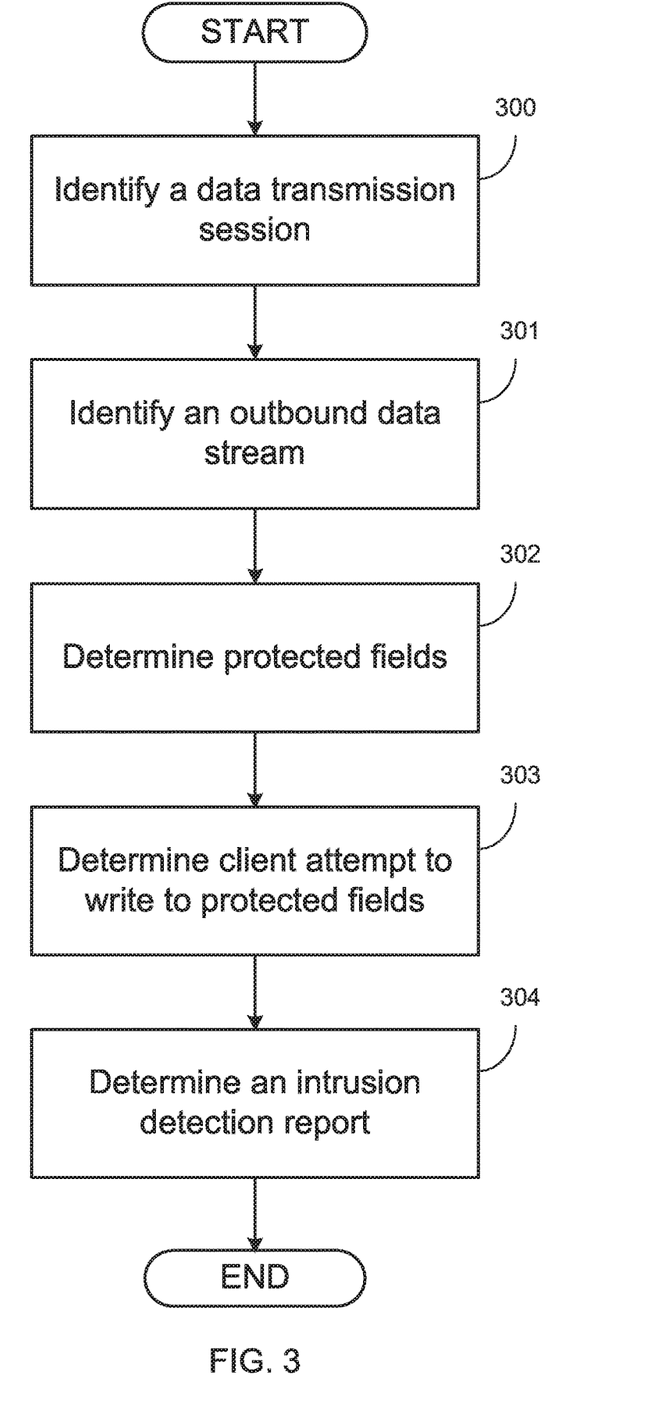
FIG. 3 is a flowchart diagram of a client intrusion detection program, in accordance with at least one embodiment of the present invention.

FIG. 3 is a flow-chart diagram of a client intrusion detection program, in accordance with at least one embodiment of the present invention. At step 300, the program identifies a data transmission session associated with a display-oriented data transmission scheme. At step 301, the program identifies an outbound data stream associated with the data transmission session. At step 302, the program determines one or more protected fields associated with the outbound data stream. In some embodiments, the display screen may be assembled progressively by the system with fields being added and/or removed progressively. In such embodiments, steps 301-302 may be repeated for each stage as the display is built up. In other embodiments, steps 301-302 may be performed once, after all fields are set and before data is sent to the server. At step 303, the program determines a client attempt to write to at least one of the one or more protected fields. At step 304, in response to determining the client attempt, the program determines an intrusion detection report. In some embodiments, step 304 may be repeated to detect multiple concurrent or near-concurrent intrusions in the same session. Similarly, in some embodiments protected fields may be monitored for intrusion simultaneously with monitoring outbound data streams to determine new protected fields.

In some embodiments, the display-oriented data transmission scheme is a display-oriented scheme associated with an IBM 3270 display terminal. In some embodiments, the display-oriented data transmission scheme is implemented using coaxial cables. In some embodiments, the display-oriented data transmission scheme is implemented in emulation over another type of network, for example a TCP/IP network. In some embodiments, the client intrusion detection program 110 further comprises identifying the client computer associated with the data transmission session. In some embodiments, the identified client computer is an IBM 3270 display terminal emulator.

In some embodiments, the intrusion detection report 150 comprises at least one intrusion property (i.e., a property associated with a detected intrusion attempt by a client into the data transmission session), wherein the at least one intrusion property is selected from the group consisting of: one or more intrusion notifications (i.e., a determination that at least one computer system and/or person should be notified of the detected client intrusion); one or more intruding client identifications (i.e., a determination about a property associated with at least one client computer determined to be performing a detected intrusion attempt); one or more intruding inbound data streams (i.e., the stream associated with an intrusion attempt); and one or more outbound data streams (i.e., a determination of those outbound streams that preceded the detected intrusion attempt by the at least one client computer, and which may have been related to the subsequent intrusion attempt).

In some embodiments, the client intrusion detection program further comprises determining one or more session characteristics (i.e., one or more properties associated with the data transmission session, such as one or more geometric properties associated with a displayed rendition of an outbound data stream transmitted via the data transmission session). In at least some of those embodiments, determining the one or more protected fields is performed based on at least one of the one or more session characteristics and the one or more protected fields.

Embodiments of the present invention enable detecting intrusions by client computers into data transmission sessions. Nevertheless, the aforementioned advantages are not required to be present in all of the embodiments of the invention and may not be present in all of the embodiments of the invention.

Figure 4:
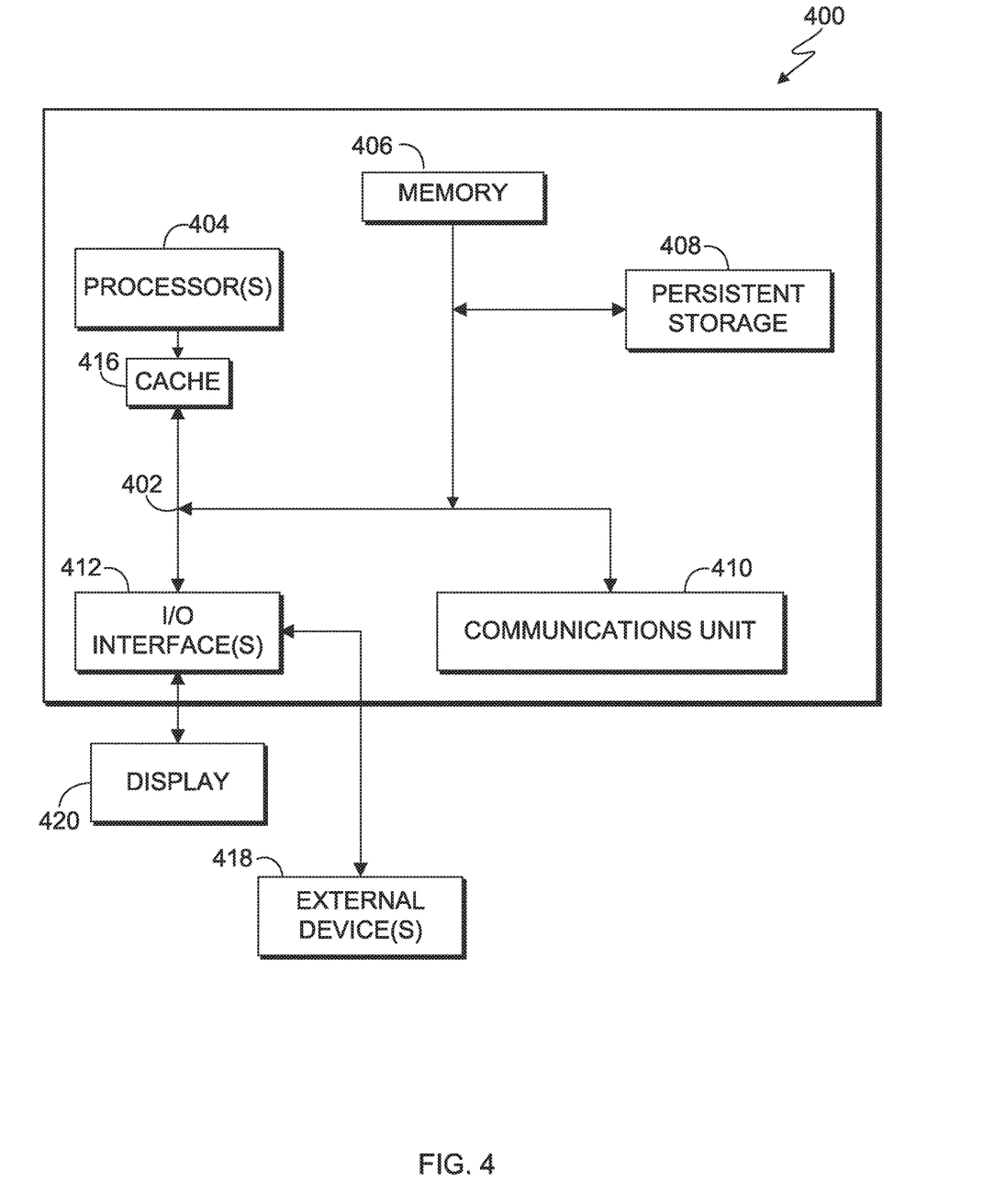
FIG. 4 is a block diagram of a computing apparatus suitable for executing a client intrusion detection program, in accordance with at least one embodiment of the present invention.

FIG. 4 is a block diagram depicting components of a computer 400 suitable for executing the client intrusion detection program. FIG. 4 displays the computer 400, the one or more processor(s) 404 (including one or more computer processors), the communications fabric 402, the memory 406, the RAM, the cache 416, the persistent storage 408, the communications unit 410, the I/O interfaces 412, the display 420, and the external devices 418. It should be appreciated that FIG. 4 provides only an illustration of one embodiment and does not imply any limitations with regard to the environments in which different embodiments may be implemented. Many modifications to the depicted environment may be made.

As depicted, the computer 400 operates over a communications fabric 402, which provides communications between the cache 416, the computer processor(s) 404, the memory 406, the persistent storage 408, the communications unit 410, and the input/output (I/O) interface(s) 412. The communications fabric 402 may be implemented with any architecture suitable for passing data and/or control information between the processors 404 (e.g., microprocessors, communications processors, and network processors, etc.), the memory 406, the external devices 418, and any other hardware components within a system. For example, the communications fabric 402 may be implemented with one or more buses or a crossbar switch.

The memory 406 and persistent storage 408 are computer readable storage media. In the depicted embodiment, the memory 406 includes a random access memory (RAM). In general, the memory 406 may include any suitable volatile or non-volatile implementations of one or more computer readable storage media. The cache 416 is a fast memory that enhances the performance of computer processor(s) 404 by holding recently accessed data, and data near accessed data, from memory 406.

Program instructions for the client intrusion detection program may be stored in the persistent storage 408 or in memory 406, or more generally, any computer readable storage media, for execution by one or more of the respective computer processors 404 via the cache 416. The persistent storage 408 may include a magnetic hard disk drive. Alternatively, or in addition to a magnetic hard disk drive, the persistent storage 408 may include, a solid state hard disk drive, a semiconductor storage device, read-only memory (ROM), electronically erasable programmable read-only memory (EEPROM), flash memory, or any other computer readable storage media that is capable of storing program instructions or digital information.

The media used by the persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of the persistent storage 408.

The communications unit 410, in these examples, provides for communications with other data processing systems or devices. In these examples, the communications unit 410 may include one or more network interface cards. The communications unit 410 may provide communications through the use of either or both physical and wireless communications links. The client intrusion detection program may be downloaded to the persistent storage 408 through the communications unit 410. In the context of some embodiments of the present invention, the source of the various input data may be physically remote to the computer 400 such that the input data may be received and the output similarly transmitted via the communications unit 410.

The I/O interface(s) 412 allows for input and output of data with other devices that may operate in conjunction with the computer 400. For example, the I/O interface 412 may provide a connection to the external devices 418, which may include a keyboard, keypad, a touch screen, and/or some other suitable input devices. External devices 418 may also include portable computer readable storage media, for example, thumb drives, portable optical or magnetic disks, and memory cards. Software and data used to practice embodiments of the present invention may be stored on such portable computer readable storage media and may be loaded onto the persistent storage 408 via the I/O interface(s) 412. The I/O interface(s) 412 may similarly connect to a display 420. The display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
    identifying a data transmission session, said data transmission session associated with a display-oriented data transmission scheme, wherein said display-oriented data transmission scheme is block-oriented, transmitting said display-oriented data in blocks of data;
    identifying one or more outbound data streams associated with said display oriented data transmission scheme of said data transmission session;
    determining one or more transmission session characteristics associated with each of said one or more outbound data streams, wherein the one or more transmission session characteristics include geometric properties mapping presentation of said outbound data stream to a display screen;
    determining one or more protected fields within said one or more outbound data streams, based on said one or more geometric properties associated with each of said one or more outbound data streams;
    identifying an inbound data stream directed to said display-oriented data transmission scheme of said data transmission session;
    simultaneously monitoring attempts to write to the one or more protected fields with determining new protected fields by monitoring outbound data streams;
    determining whether said inbound data stream attempts to write to at least one of said one or more protected fields; and
    in response to determining that said inbound data stream attempts to write to at least one of said one or more protected fields, determining an intrusion detection report, which includes identification of a source of said inbound data stream, wherein said intrusion detection report comprises:
        one or more intrusion notifications;
        one or more intruding client identifications;
        one or more intruding inbound data stream identifications; and
        one or more outbound data stream identifications.

2. The computer-implemented method of claim 1, wherein said display-oriented data transmission scheme is a display-oriented scheme associated with a display terminal.

3. The computer-implemented method of claim 1, further comprising:
    determining one or more session characteristics, said one or more session characteristics being associated with said data transmission session; and
    wherein determining said one or more protected fields is performed based on at least one of said one or more session characteristics of said one or more outbound data streams of said data transmission session.

4. The computer-implemented method of claim 1, further comprising:
    identifying a client computer, said client computer being associated with said data transmission session.

5. The method of claim 1, wherein the display-oriented data transmission scheme is implemented in emulation over a TCP/IP network.

6. The method of claim 1, wherein said intrusion detection report comprises a combination of one or more data artefacts that include information about at least one property associated with an attempt to intrude into the display-oriented data transmission scheme of said data transmission session.

7. A computer program product, comprising one or more computer readable storage media and program instructions stored on said one or more computer readable storage media, said program instructions comprising instructions to:
    identify a data transmission session, said data transmission session associated with a display-oriented data transmission scheme, wherein said display-oriented data transmission scheme is block-oriented, transmitting said display-oriented data in blocks of data;
    identify one or more outbound data streams associated with said display-oriented data transmission scheme of said data transmission session;
    determining one or more transmission session characteristics associated with each of said one or more outbound data streams, wherein the one or more transmission session characteristics include geometric properties mapping presentation of said outbound data stream to a display screen;
    determining one or more protected fields within said one or more outbound data streams, based on said one or more geometric properties associated with each of said one or more outbound data streams;
    identify an inbound data stream directed to said display-oriented data transmission scheme of said data transmission session;
    simultaneously monitoring attempts to write to the one or more protected fields with determining new protected fields by monitoring outbound data streams;
    determine whether said inbound data stream attempts to write to at least one of said one or more protected fields; and
    in response to determining that said inbound data stream attempts to write to at least one of said one or more protected fields, determine an intrusion detection report, which includes identification of a source of said inbound data stream, wherein said intrusion detection report comprises:
        one or more intrusion notifications;
        one or more intruding client identifications;
        one or more intruding inbound data stream identifications; and
        one or more outbound data stream identifications.

8. The computer program product of claim 7, wherein said display-oriented data transmission scheme is a display-oriented scheme associated with a display terminal.

9. The computer program product of claim 7, wherein:
    said program instructions further comprise instructions to determine one or more session characteristics, said one or more session characteristics being associated with said data transmission session; and
    said instructions to determine said one or more protected fields are performed based on at least one of said one or more session characteristics of said one or more outbound data streams of said data transmission session.

10. The computer program product of claim 7, wherein said program instructions further comprise instructions to identify a client computer, said client computer being associated with said data transmission session.

11. The computer program product of claim 7, wherein the display-oriented data transmission scheme is implemented in emulation over a TCP/IP network.

12. A computer system comprising:
    a processor;
    one or more computer readable storage media; and
    computer program instructions;

said computer program instructions being stored on said one or more computer readable storage media; and said computer program instructions comprising instructions to:

identify a data transmission session, said data transmission session associated with a display-oriented data transmission scheme, wherein said display-oriented data transmission scheme is block-oriented, transmitting said display-oriented data in blocks of data;

identify one or more outbound data streams associated with said display-oriented data transmission scheme of said data transmission session;

determining one or more transmission session characteristics associated with each of said one or more outbound data streams, wherein the one or more transmission session characteristics include geometric properties mapping presentation of said outbound data stream to a display screen;

determining one or more protected fields within said one or more outbound data streams, based on said one or more geometric properties associated with each of said one or more outbound data streams;

identify an inbound data stream directed to said display-oriented data transmission scheme of said data transmission session;

simultaneously monitoring attempts to write to the one or more protected fields with determining new protected fields by monitoring outbound data streams;

determine whether said inbound data stream attempts to write to at least one of said one or more protected fields; and in response to determining that said inbound data stream attempts to write to at least one of said one or more protected fields, determine an intrusion detection report, which includes identification of a source of said inbound data stream, wherein said intrusion detection report comprises:

one or more intrusion notifications;
one or more intruding client identifications;
one or more intruding inbound data stream identifications; and
one or more outbound data stream identifications.

13. The computer system of claim 12, wherein said display-oriented data transmission scheme is a display-oriented scheme associated with a display terminal.

14. The computer system of claim 12, wherein:

said computer program instructions further comprise instructions to determine one or more session characteristics, said one or more session characteristics being associated with said data transmission session; and said instructions to determine said one or more protected fields are performed based on at least one of said one or more session characteristics of said one or more outbound data streams of said data transmission session.

15. The computer system of claim 12, wherein said program instructions further comprise instructions to identify a client computer, said client computer being associated with said data transmission session.

16. The computer system of claim 12, wherein the display-oriented data transmission scheme is implemented in emulation over a TCP/IP network.

17. The computer system of claim 12, wherein said intrusion detection report comprises a combination of one or more data artefacts that include information about at least one property associated with an attempt to intrude into the display-oriented data transmission scheme of said data transmission session.

* * * * *